United States Patent Office 3,346,006
Patented Oct. 10, 1967

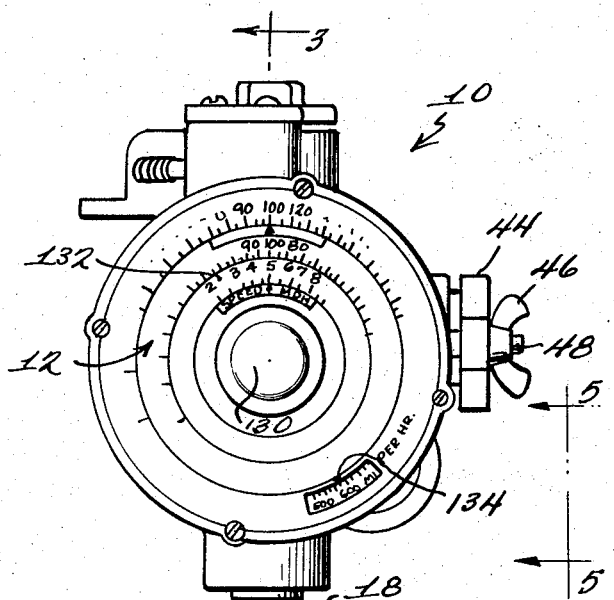
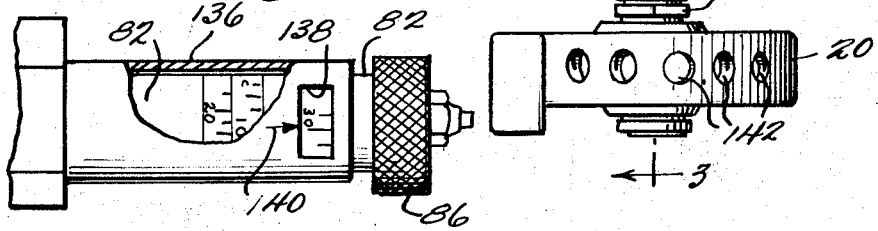
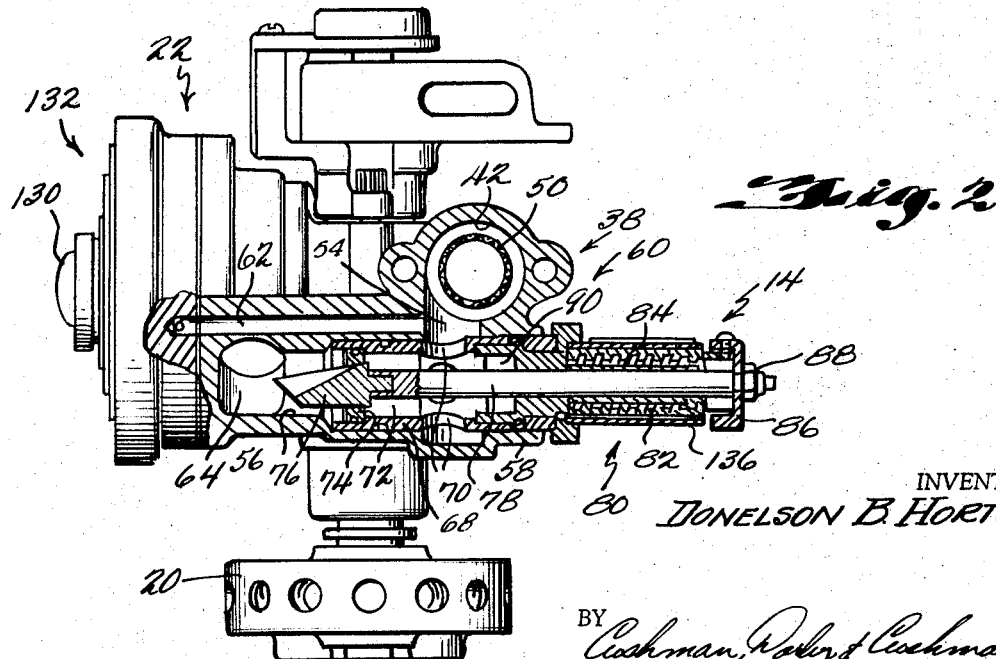

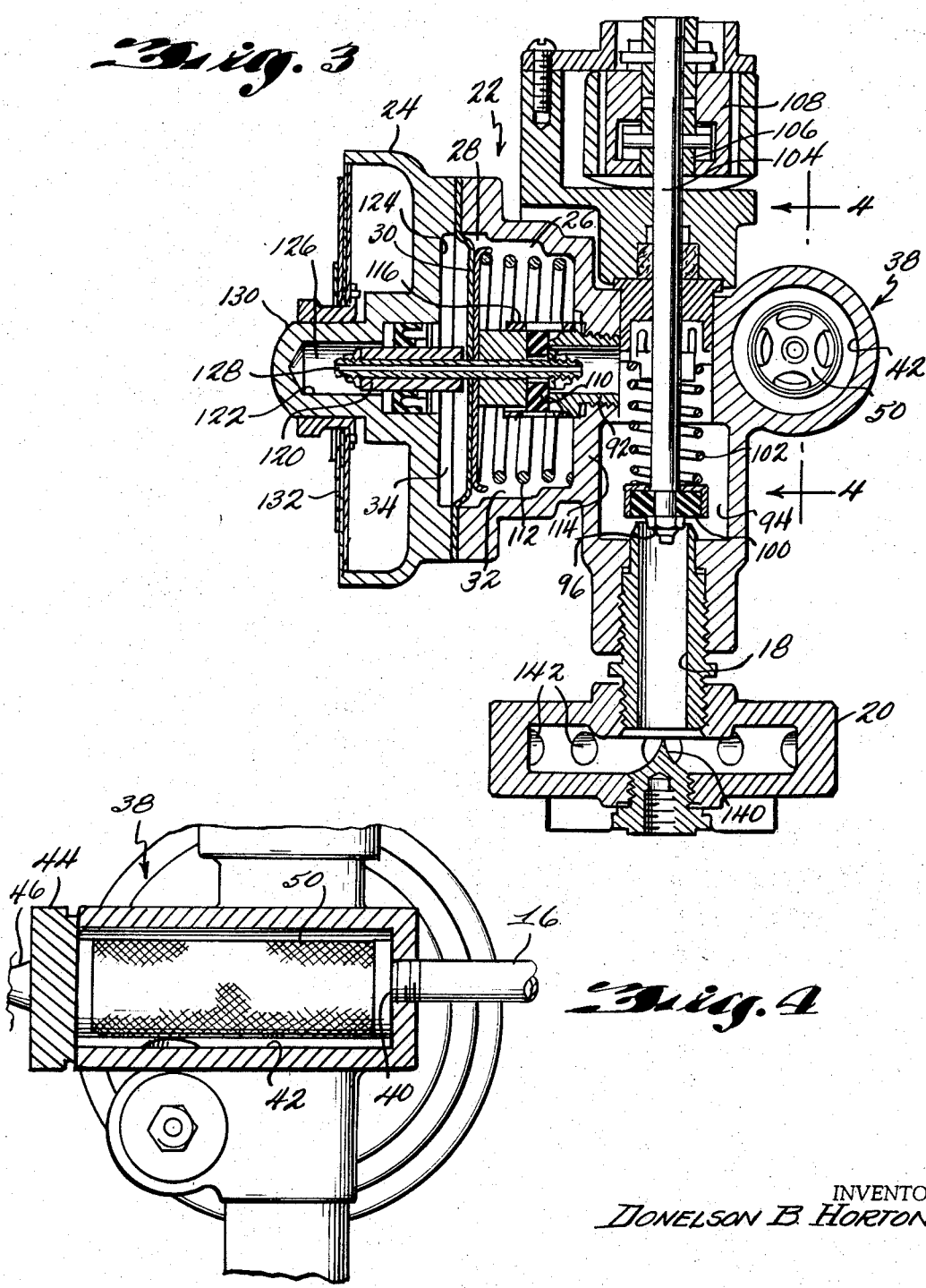

3,346,006
FLUID METERING DEVICE
Donelson B. Horton, Madison, Ala., assignor to John Blue Company, Inc., Huntsville, Ala., a corporation of Alabama
Filed Mar. 12, 1965, Ser. No. 439,271
6 Claims. (Cl. 137—501)

The present invention relates to apparatus for distributing liquids and, more particularly, relates to a metering device for distributing anhydrous ammonia and other similar liquids useful in agricultural applications from a moving vehicle into the soil at a constant rate of liquid application per unit of soil area.

In order to provide such a constant rate of application, the metering device of the present invention provides a flow of liquid for distribution from a tank source and compensates for various fluctuations in conditions of the system which tend to alter the desired flow rate. These fluctuations are primarily due, it has been found, to (1) changes in the pressure within the supply tank, and (2) back pressure changes caused by variations in soil conditions, rate of output, restrictions in the system and the initial tank pressure.

U.S. Patent No. 2,909,191, issued Oct. 20, 1959, to the John Blue Company as my assignee, also describes a metering device for the distribution of anhydrous ammonia which device provides for a uniform application of liquid with compensation for the aforesaid changes in tank pressure, back pressure and speed of the vehicle. It is to be understood, however, that the invention herein described and claimed differs from and constitutes a significant improvement over the device disclosed in the aforesaid patent, having additional advantages and capable of achieving objects not heretofore possible.

Normally, in the large scale application of liquid fertilizers and the like, a vehicle which carries or drives a large liquid storage tank moves over the field to be fertilized. This vehicle is also provided with any of a variety of types of fluid applicators which may contact and penetrate the soil and which serve as conduits for communicating liquid ammonia, or the like, from the supply tanks to the soil. Ordinarily, these applicators comprise single curved members which penetrate the soil to some extent and inject the liquid to a depth of several inches. The members are typically spaced apart transversely with respect to the direction of travel of the vehicle. Thus, on a single pass of the vehicle, the swath width, or transverse dimension which is fertilized, is dependent upon the number and spacing of the applicators.

Generally, the prior apparatus depended solely upon the pressure in the supply tank to cause flow of liquid and did not have the flexibility necessary to successfully provide a uniform distribution of the liquid fertilizer over the field area. Consequently, they supplied a varying flow due to the aforesaid changes in vehicle speed, tank pressure and back pressure conditions which inevitably occur.

Accordingly, it is an object of the present invention to provide a metering apparatus for use in applying liquid anhydrous ammonia and other liquids to the soil, which apparatus overcomes the aforesaid disadvantages causing variations in the rate of application of the liquid to the soil.

Another object of the present invention is to provide a flow regulator for use in apparatus for distributing liquid to the soil from a moving vehicle, the flow regulator being adjustable by the operator of the vehicle for a particular flow rate which may be easily and rapidly computed from known conditions of swath width, vehicle speed and the desired pounds of fertilizer per unit area.

Still another object of the present invention is to provide a metering device which will automatically compensate, in an improved manner, for back pressure fluctuations in the conduits leading to the distributing means, the compensation being such that the quantity of liquid being distributed is unaltered.

Still a further object of the present invention is to provide a flow regulator for use in a system for metering liquified gas, the rate of flow of the metered fluid remaining substantially constant in spite of rapid fluctuations as wide variations in the pressure in the tank wherefrom liquid is delivered to the metering means.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a front elevational view of the metering device of the present invention.

FIGURE 2 is a side elevational view, partially in section, to show the metering rate adjustment mechanism, of the metering device disclosed in FIGURE 1.

FIGURE 3 is a vertical sectional view taken on the line 3—3 of FIGURE 1.

FIGURE 4 is a fragmentary sectional view taken on the line 4—4 of FIGURE 3.

FIGURE 5 is a fragmentary view of the metering rate adjustment handle taken on line 5—5 of FIGURE 4.

Referring now to the drawings, it is to be understood that the metering device of the present invention is, in operation, mounted upon a vehicle and positioned in the liquid lines between the liquid supply tank and the distributing means which convey the liquid into the soil. As the construction and operation of the present invention do not require detailed explanations and illustrations of the supply tank, vehicle or distributing means, these being well known, such details are omitted from the drawings and description herein. However, as an example of the associated tank vehicle and distributing means, U.S. Patent No. 2,696,785, issued Dec. 14, 1954, illustrates a typical environment in which the present invention would operate.

The metering device of the present invention is indicated generally by the numeral 10 and is carried in a convenient location such as a dashboard or instrument panel on a vehicle, or in such other location as may be accessible to the operator thereof. In particular, the device 10 should be mounted and disposed so that the driver of the vehicle may have convenient access to both the front face of the device, indicated generally at 12 and the rearward portion, including the flow rate adjustment handle indicated generally at 14 (see FIGURE 2).

As is best shown in FIGURE 4, a metering device 10, which essentially utilizes a differential pressure in order to meter the fluid, is provided with an inlet conduit 16 which is to be connected to a suitable source of supply such as a pressure vessel containing liquified anhydrous ammonia, and an outlet conduit 18 (see FIGURE 3) which conveys the metered fluid to a manifold 20 for distribution through individual outlets 142 to the individual applicators (not shown).

As shown in FIGURE 3, metering device 10 includes a casing 22 formed of two sections 24 and 26, the sections 24 and 26 when positioned together defining a chamber 28 therein. A flexible diaphragm 30 is supported by the sections 24 and 26 of casing 22 and divides chamber 28 into a flow chamber 32 and a pressure chamber 34. Suitable bolts (not shown) circumferentially spaced about the perimeter of the casing 24 and passing through its two sections 24 and 26 cooperate to hold these sections together, and also hold the diaphragm 30 in place.

Section 26 of casing 22 is provided with a housing, generally indicated at 38, integral therewith, the housing having a threaded opening 40 for receiving the threaded end of supply conduit 16. A horizontal bore 42 is reduced at the end in communication with the opening 40. A cover plate 44 provided at the opposite side of the housing 38 is held in positon by wing nuts 46 received on studs 48 extending outwardly from the housing. A suitable filter element such as a tubular screen 50 is provided in bore 42, the screen 50 being adapted to remove any solid material which may be present in the liquid flowing from the supply tank to the metering device. With the filter disposed within the bore, cover 44 closes the end of bore 42 in liquid-tight arrangement.

As is best shown in FIGURE 2, a vertical passageway 54 places the bore 42 in communication with a longitudinal bore 56 which is also provided in housing 38. This bore 56 has an interiorly threaded boss 58 which is adapted to receive the metering rate assembly, generally indicated at 60. A further passageway 62 is provided within housing 38 which places the bore 42 in direct communication with pressure chamber 34. Passageway 64, at the interior end of bore 56, places that bore in communication with flow chamber 32.

The metering rate assembly 60 comprises a tubular member 68 which is adapted to be received by the interiorly threaded boss 58 in fluid-tight relation. The member 68 is further provided with a plurality of peripherally disposed apertures 70 communicating the passageway 54 with the cavity 72 of the member 68, and with a restricted orifice 74 in the inner end of the tubular member 68 adjacent to the passageway 64. This restricted orifice is thus positioned between the inlet 16 and the flow chamber 32 and provides a pressure differential between the liquid in the passageway 54 and the flow chamber 32. A valve element 76 is provided with a stem portion 78 which extends through a sleeve 80 secured to the tubular member 68 and extending outwardly therefrom away from the housing 38. More specifically, the valve element 76 is adapted to reciprocate into and out of orifice 74 by means of the rotatable handle portion 82 which has an interiorly threaded surface interfitting with a correspondingly threaded rigid member 84. The valve stem 78 passes through this member 84 and is adapted to rotate with respect thereto. The reduced end of the stem 78 is received within a knurled knob 86 and secured thereto by means of a nut or fastener 88. This knob in turn is secured to the freely rotatable handle portion 82. Thus, when the knurled knob 86 is rotated, the corresponding threaded portions 82, 84 act as mating inclined planes thereby moving the valve stem 78 and the valve 76 longitudinally. Since the valve 76 may thus reciprocate into and out of the orifice 74 it will be appreciated that the size of the orifice may be varied at will by rotation of the handle 82 or knob 86. Suitable packing means 90 may be provided about the stem portion 78 to prevent escape of fluid through the member 84.

The flow chamber 32 is provided with an outlet 92 (see FIGURE 3) which communicates with a further chamber 94 within the housing 38. This chamber 94 also has an outlet opening 96 which communicates with the distributing manifold 20 through the outlet 18. A suitable shut-off valve 100 is provided in outlet chamber 94 and is adapted to close off the outlet opening 96 under the action of a spring 102 also disposed substantially within the outlet chamber 94. As shown in FIGURE 3, this valve is further provided with a vertically extending valve stem 104 which is secured to a cam follower 106 near its upper end. Thus, when the cam 108 is rotated, the valve stem may be moved longitudinally to permit the valve 100 to close or open the outlet 96, as desired.

If ideal conditions could be obtained, where there would be no variation of the pressure supplying fluid from the supply tank, fluid would be metered through the regulator 10 uniformly and without changes in the rate of flow, provided the valve 100 were open. However, such ideal conditions are rarely, if ever, obtained and more normally the pressure in the supply tank is subject to frequent and sudden variations, thus causing instantaneous variations in the pressure of the liquid within the regulator. It will be appreciated that such fluctuations in pressure will cause proportional variations in the rate of flow of liquid through the regulator.

In order to compensate for potential variations in the flow rate due to these fluctuations in the supply pressure, a regulating valve 110 (shown in closed position) is attached to the flow chamber side of the diaphragm 30 and is adapted to cooperate with the outlet opening 92 to vary the size of the opening depending on the relative positioning of the diaphragm 30. A spring 112 is provided between the diaphragm 30 and the end wall 114 of the flow chamber 32 in order to normally urge the valve 110 toward an open position. Guide means 116, such as a perforated sleeve, may be provided about the opening 92 in order to assure that the valve 110 is essentially limited in movement to reciprocation. Since the supply pressure is directly transmitted to chamber 34, and the pressure is reduced in passing through the orifice 74 to the chamber 32, a pressure differential, corresponding precisely to the differential across orifice 74, will exist between chambers 32 and 34.

Thus it will be seen that under constant pressure conditions in the supply tank, and consequently in the inlet passageway 54, the pressure differential between chambers 32 and 34 will remain constant and the valve 110 will also remain open a predetermined distance under the constant force of the spring 112. However, an increase in pressure in the passageway 54 will be immediately transmitted to pressure chamber 34, thus upsetting the pressure differential between the chambers 32 and 34. This increase in differential will tend to force the diaphragm and the valve 110 to the right, thus reducing the size of the opening between the valve and the outlet 92. With this opening reduced, pressure will build up almost instantaneously in chamber 32 until the diffential between the chambers 32 and 34 is again equal to the pressure differential across the orifice 74 and in equilibrium. Consequently the quantity of liquid flowing out of the outlet 92 will remain uniform. Conversely, if the pressure in the passageway 54, and consequently the pressure chamber 34, is reduced the pressure diffential between chambers 32 and 34 will momentarily be reduced, thereby tending to move diaphragm 30 toward the left. Therefore valve 110 will also move away from the outlet 92, thereby increasing the size of the space between the valve and the outlet 92 leading to the chamber 94. This increase in the opening will allow more flow from the chamber 32 into the chamber 94 thereby causing a drop in the pressure within the chamber 32. Thus as the pressure in the chamber 32 is lowered, the pressure differential is once again restored to a constant value so that equilibrium of the diaphragm and valve 110 position is maintained. In summary, it will be seen that a metering device is provided wherein fluctuation in the supply pressures of the metered fluid will be compensated for so that a constant rate of fluid flow through the device is maintained.

However, since the distributing means (not shown) passes through the soil, various soil conditions, restrictions, etc., will cause back pressure changes or fluctuations which are transmitted back through the distributing system to the manifold 20 and on back to the outlet opening 92 in the flow chamber 32. If these back pressure changes or fluctuations were small, there would be little or not effect on the pressure differential between the chambers 32 and 34, but since they may vary under field conditions from about 10 to 100 lbs./sq. in., they can materially affect the uniform metering of the liquid by the force exerted upon the face of the valve 110 which force tends to open the valve and unbalance the pressure differential.

To compensate for the aforesaid back pressure changes I have provided, on the pressure chamber side of the diaphragm 30, a rod or piston element 120 which is adapted to be received within a bore 122 in the end wall 124 of the chamber 34. As shown in the embodiment of FIGURE 3, communication is provided between the piston chamber 126, bounded by the bore 122 and the face fo the piston 120, and the flow chamber outlet opening 92, More particularly, the valve 100 and the piston 120 are both secured to the diaphragm 30 by means of a hollow member 128 which extends therethrough. Thus, chambers 32 and 34 are isolated from one another, but the chamber 126 is adapted to maintain the same pressure that is exerted within the outlet 92. It should be noted that the piston 120 is formed with a cross-sectional area slightly less than the effective cross-sectional area on valve 110, for reasons that will become apparent hereinafter. Thus, when back pressure variations are transmitted to the opening 92, rather than exerting additional force on the face of the valve 110 and thereby disrupting the pressure differential, the same pressures are immediately transmitted to chamber 126 where they act against the face of the piston 120 thereby largely counteracting the force exerted on the face of the valve 110. Thus, the metering of the present device is substantially unaffected by changes in back pressure due to varying soil conditions, restrictions and other changes in the system.

It should be appreciated, however, that an additional source of flow rate variation remains. Due to the thermodynamic properties of ammonia, a constant differential regulator such as described herein will tend to deliver slightly less output from a supply tank when the tank pressure is low than it will when the tank pressure is high. It is also an object of the present invention to compensate for these changes in flow rate due to the gradual changes in the magnitude of the supply tank pressure during the fertilizing operation.

This compensation is brought about by forming the bore 122 with a cross-sectional area slightly less than that of the cross-sectional area of the outlet 92. Thus, the area of the face of the piston 120 is smaller than the effective area of the face of the valve 110 which is subjected to pressure in the opening 92. Therefore, slightly greater force will be exerted upon the valve 110 than upon the piston 120 when both surfaces are subjected to the same pressure. Thus, in effect, the pressure differential is decreased slightly as the pressure within the supply tank, and therefore throughout the system, increases and this decreae in the differential effectively compensates for the increased flow which would have normally occurred under the increased supply pressure. Conversely, if the pressure in the supply tank decreases during the fertilizing operation, the pressure differential is increase slightly, and the flow will be adjusted by a slight movement of the valve 110. I have found that this balancing mechanism as described enables ammonia to be metered accurately over a wide range of approximately 20 pounds to 250 pounds pressure at the supply tank.

In operation, when connected between a liquid force under pressure and distributing means as described hereinbefore, the regulator will commence metering liquid immediately when the shut-off valve 100 is moved to an open position by the cam 108. Before metering is begun however, it is both desirable and necessary to set the regulator so that it will meter liquid at a rate of flow which will bring about the desired fertilization. As shown in FIGURE 1, the front face of the casing 22 is provided with a hub 130 which may also form the walls of the piston chamber 126. A rotary slide rule 132 is operatively mounted on the face of the casing 22 with the hub 130 protruding through the center of the slide rule. The indicia on the face of the rule 132 are calibrated and marked to show various ranges of swath width, pounds of fertilizer per unit area and speed of travel of the vehicle. When the proper unit on each scale is aligned with the other proper units by arrows on each scale, a resultant reading of flow rate in mass (or weight) per unit of time is indicated by an arrow at 134.

The outer surface of the handle portion 82 is similarly calibrated to indicate flow rate in mass per unit time and rigid sleeve 136 partially encloses the member 82. A window 138 (see FIGURE 5) in the sleeve 136 enables the operator to see the particular indicia corresponding to the rate of flow through the orifice 74 at that position of the member 82 and thereby to set the valve 76 for the desired flow rate. All that the operator need do is to turn the knurled knob 86 until the same figure indicated at 134 appears through the window 138 opposite the marking arrow 140. When this figure appears, the valve 76 is positioned so as to permit this indicated rate of flow to pass through the orifice 74. It will be apparent that no particular skills are involved in selecting the proper flow rate for desired conditions and that the setting of the valve 76 can be accomplished with a minimum of skill and experience on the part of the operator. Thus, with the valve 76 set for the proper flow rate, and the shut-off valve 100 in an open position, the device will continuously meter liquid at the desired rate, compensating for variations in the supply pressure and back pressure in the manner hereinbefore described.

When the metered fluid passes through the outlet 18, it enters into the manifold 20. This manifold is provided with a diffuser 140 which causes the liquid to be turned toward the various distributing outlets 142 with a minimum of loss of kinetic energy. This smooth transition afforded by the diffuser 140 also tends toward greater equalization of the flow among the various outlets 142.

It will be obvious from the above description that the present invention provides a versatile and practical metering device of the flow regulator type for distributing liquid anhydrous ammonia and similar liquids while compensating for various factors which tend to cause irregularities in the flow rate of the liquid. Thus, the present invention provides an accurate means for metering the liquid, taking into account and compensating for fluctuations in the pressure at the supply source and variations in back pressure developed in the system due to field conditions. In addition, the present flow regulator incorporates means to provide accurate metering of the liquid over the entire range of pressures which may exist in the supply source during the fertilizing operation. It will also be realized that although the present metering device has been described and illustrated as being provided with an adjustable metering orifice in association with various indicia for selecting the flow rate and setting the orifice for such a rate, the device may be provided with a fixed metering orifice or the indicating means may be eliminated. However, the terminology used in the specification and the particular embodiment disclosed therein is for the purpose of description and not limitation, the scope of the invention being defined in the appended claims.

What is claimed is:

1. A flow regulator for metering a fluid from a pressure source to the soil at a constant rate of application per unit area from a traveling distributor, comprising: casing means having an inlet and an outlet for fluid flow therethrough; means associated with said casing means for adjusting the rate of fluid flow through said casing in accordance with predetermined conditions, said conditions including the rate of travel of said distributor; means associated with said casing means to compensate for potential variations in said rate of fluid flow caused by fluctuations in the pressure at said pressure source; means associated with said casing to compensate for potential variations in said rate of fluid flow caused by pressure fluctuations due to resistance of the soil to the application of fluid from said traveling distributor; last said means also being responsive to the magnitude of the pressure at said pressure source so as to compensate for potential variations in said rate of fluid flow due to the gradual change in the magnitude of the pressure at said source.

2. A flow regulator for metering a fluid from a pressure source thereof to a distributing means, comprising: a casing having a flow chamber and a pressure chamber, said flow chamber having an inlet and an outlet, said casing also being provided with a passageway placing said pressure source in communication with said pressure chamber; a diaphragm forming a wall common to said chambers and responsive to pressure differentials therebetween; a restricted orifice for providing communication, and for causing a pressure differential between said pressure source and said flow chamber inlet, a metering valve movable into and out of said orifice for varying the area thereof in order to vary the rate of flow therethrough; means for moving said metering valve with respect to said orifice to thereby set the regulator for a predetermined volumetric rate of flow of fluid; a pressure regulating valve adapted to provide a variable opening between said flow chamber and said flow chamber outlet, pressure in said outlet being effective to develop a force against said regulating valve; a connection between said regulating valve and said diaphragm for operating said valve to decrease said opening when there is an increase in said pressure differential and to increase said opening when there is a decrease in said pressure differential to thereby maintain the latter substantially constant; means responsive to pressure connected to said diaphragm for substantially counterbalancing the force on said regulating valve developed by pressure in said flow chamber outlet; means for communicating the pressure in said outlet to said pressure responsive means; said pressure responsive means being adapted to develop a force less than the said force acting against said regulating valve when said valve and said responsive means are subjected to equal pressures, whereby said variable opening is also regulated to compensate for decreased flow rates due to low pressure at said pressure source and elevated flow rates due to high pressure at said pressure source.

3. Apparatus as defined in claim 2 and additionally comprising: a manifold having an inlet in communication with said flow chamber outlet, said manifold being provided with a plurality of distributing outlets, and a diffuser element disposed within said manifold in the path of liquid flow through said manifold inlet and adapted to equalize the flow of liquid to said distributing outlets.

4. Apparatus as defined in claim 2 wherein a spring disposed within said flow chamber normally biases said regulating valve away from said flow chamber outlet toward an open position.

5. A flow regulator for metering a fluid from a pressure source thereof to a distributing means, comprising: a casing having a flow chamber and a pressure chamber, said flow chamber having an inlet and an outlet, said casing also being provided with a pasageway placing said pressure source in communication with said pressure chamber; a diaphragm forming a wall common to said chambers and responsive to pressure differentials therebetween; a restricted orifice for providing communication, and for causing a pressure differential between said pressure source and said flow chamber inlet, a metering valve movable into and out of said orifice for varying the area thereof in order to vary the rate of flow therethrough; means for moving said metering valve with respect to said orifice to thereby set the regulator for a predetermined volumetric rate of flow of fluid; a pressure regulating valve adapted to provide a variable opening between said flow chamber and said flow chamber outlet, pressure in said outlet being effective to develop a force against said regulating valve; a connection between said regulating valve and said diaphragm for operating said valve to decrease said opening when there is an increase in said pressure differential, and to increase said opening when there is a decrease in said pressure differential to thereby maintain the latter substantially constant; said casing also having a bore in the end wall of said pressure chamber adapted to receive a fluid piston; a piston secured to said diaphragm and adapted to reciprocate within said bore; means placing said bore in communication with said flow chamber outlet; said bore having a cross-sectional area slightly less than the effective cross-sectional area of said flow chamber outlet so that a greater force is exerted against the flexible diaphragm at higher tank pressures, whereby a greater closing force is exerted on the regulating valve when the pressure source is high and a lesser opening force is exerted on the regulating valve when the pressure source is low.

6. A flow regulator for metering a fluid from a pressure source thereof to a traveling distributor for application at a lower pressure to the soil, comprising: a casing having a flow chamber and a pressure chamber; said casing also having a first passageway and a second passageway placing said flow chamber and said pressure chamber, respectively, in communication with said pressure source; orifice mean disposed within said first passageway for causing a pressure differential between said pressure source and said flow chamber; pressure regulating means responsive to changes in said presure differential for maintaining said pressure differential constant; means for adjusting said orifice means to adjust the rate of flow of liquid through said regulator; means responsive to the magnitude of pressure within said casing to maintain a constant rate of liquid flow over a wide range of pressures at said pressure source; means associated with said regulator comprising rotary slide means operatively mounted on the face of said casing and having indicia for indicating proper rate of flow from variable conditions of desired quantity of liquid per unit area, swath width and rate of travel of the distributor; said orifice adjusting means including a rotatable handle member carrying associated indicia thereon to indicate the setting of said adjusting means to provide the rate of flow through said orifice means indicated by said flow indicating means.

References Cited
UNITED STATES PATENTS

| | | | |
|---|---|---|---|
| 2,742,764 | 4/1956 | St. Clair | 137—501 X |
| 2,807,144 | 9/1957 | St. Clair | 137—501 X |
| 2,909,191 | 10/1959 | Horton | 137—501 |
| 2,915,084 | 12/1959 | Taylor et al. | 137—501 |

M. CARY NELSON, *Primary Examiner.*

R. J. MILLER, *Assistant Examiner.*